(12) United States Patent
Volbers

(10) Patent No.: US 11,261,513 B2
(45) Date of Patent: Mar. 1, 2022

(54) STRIP OF A COBALT IRON ALLOY, LAMINATED CORE AND METHOD OF PRODUCING A STRIP OF A COBALT IRON ALLOY

(71) Applicant: Vacuumschmelze GmbH & Co. KG, Hanau (DE)

(72) Inventor: Niklas Volbers, Bruchköbel (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 0 days.

(21) Appl. No.: 16/826,236

(22) Filed: Mar. 22, 2020

(65) Prior Publication Data

US 2020/0299820 A1    Sep. 24, 2020

(30) Foreign Application Priority Data

Mar. 22, 2019    (DE) .......................... 102019107422.3

(51) Int. Cl.
*C22F 1/10*    (2006.01)
*C21D 8/12*    (2006.01)
(Continued)

(52) U.S. Cl.
CPC .............. *C22F 1/10* (2013.01); *B32B 15/011* (2013.01); *C21D 8/12* (2013.01); *C21D 8/1222* (2013.01);
(Continued)

(58) Field of Classification Search
CPC ... H01F 1/147; H01F 1/16; H01F 1/18; H01F 27/24; H01F 27/245; H01F 27/2455; H01F 27/25; H01F 41/02; H01F 41/0206; H01F 41/0213; H01F 41/0233; H01F 41/024; B32B 15/00; B32B 15/01; B32B 15/011; B32B 15/04; B32B 15/043; B32B 15/18; C22C 19/00; C22C 19/002; C22C 19/005; C22C 19/007; C22C 19/07; C22C 30/00; C22C 38/10; C22C 38/105; C22C 38/30;
(Continued)

(56) References Cited

U.S. PATENT DOCUMENTS 3,622,409 A    11/1971    McCunn et al.
3,634,072 A    1/1972    Ackermann et al.
(Continued)

FOREIGN PATENT DOCUMENTS

DE    102005034486 A1    2/2007
DE    102009043539 A1    4/2011
(Continued)

*Primary Examiner* — Vanessa T. Luk
(74) *Attorney, Agent, or Firm* — Dickinson Wright PLLC

(57) ABSTRACT

A method of producing a strip from a CoFe alloy is provided. A slab consisting substantially of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, the remainder being Fe and up to 1 wt % of impurities, is hot rolled and then quenched from a temperature above 700° C. to less than 200° C. The hot rolled strip is cold rolled. The cold rolled strip is stationary annealed to produce an intermediate strip, and the intermediate strip is continuously annealed.

29 Claims, 4 Drawing Sheets

(RD, rolling direction)

(51) Int. Cl.
*B32B 15/01* (2006.01)
*C22C 30/00* (2006.01)
*C22F 1/00* (2006.01)
*H01F 1/147* (2006.01)
*H01F 27/25* (2006.01)
*H01F 41/02* (2006.01)

(52) U.S. Cl.
CPC ......... *C21D 8/1233* (2013.01); *C21D 8/1261* (2013.01); *C21D 8/1272* (2013.01); *C22C 30/00* (2013.01); *C22F 1/002* (2013.01); *H01F 1/147* (2013.01); *H01F 27/25* (2013.01); *H01F 41/02* (2013.01); *C22C 2202/02* (2013.01)

(58) Field of Classification Search
CPC ..... C22C 38/52; C22C 2202/02; C22F 1/002; C22F 1/10; C21D 1/26; C21D 1/28; C21D 1/30; C21D 1/32; C21D 6/007; C21D 8/005; C21D 8/02; C21D 8/0205; C21D 8/021; C21D 8/0221; C21D 8/0226; C21D 8/0236; C21D 8/0247; C21D 8/0263; C21D 8/0273; C21D 8/04; C21D 8/0405; C21D 8/041; C21D 8/0421; C21D 8/0426; C21D 8/0436; C21D 8/0447; C21D 8/0463; C21D 8/0473; C21D 8/12; C21D 8/1205; C21D 8/1216; C21D 8/1222; C21D 8/1233; C21D 8/1244; C21D 8/1261; C21D 8/1272; C21D 9/46; C21D 9/48; C21D 9/52

See application file for complete search history.

(56) References Cited

U.S. PATENT DOCUMENTS

| | | | |
|---|---|---|---|
| 2003/0034092 A1* | 2/2003 | Takashima | C21D 8/1255 148/111 |
| 2008/0042505 A1 | 2/2008 | Gerster et al. | |
| 2011/0074529 A1 | 3/2011 | Roth | |
| 2013/0000797 A1 | 1/2013 | Pieper et al. | |
| 2014/0283953 A1* | 9/2014 | Waeckerle | C22C 38/12 148/121 |
| 2014/0299331 A1 | 10/2014 | Hart | |
| 2018/0112287 A1 | 4/2018 | Fitterling | |
| 2018/0223401 A1* | 8/2018 | Waeckerle | C21D 1/76 |
| 2019/0360065 A1 | 11/2019 | Volbers et al. | |

FOREIGN PATENT DOCUMENTS

| | | | |
|---|---|---|---|
| DE | 102012105605 A1 | 1/2013 | |
| DE | 102016222805 A1 | 5/2018 | |
| GB | 2492406 A | 1/2013 | |
| JP | H05279784 A | 10/1993 | |
| WO | 2007009442 A1 | 1/2007 | |
| WO | WO-2017016604 A1 * | 2/2017 | ......... H01F 1/14783 |
| WO | 2018091694 A1 | 5/2018 | |

* cited by examiner (RD, rolling direction)

STRIP OF A COBALT IRON ALLOY, LAMINATED CORE AND METHOD OF PRODUCING A STRIP OF A COBALT IRON ALLOY

This U.S. patent application claims the benefit of DE Patent Application No. 10 2019 107 422.3, filed Mar. 22, 2019, the entire contents of which are incorporated herein by reference for all purposes.

BACKGROUND

1. Technical Field

The invention concerns a strip of a cobalt iron alloy, a laminated core and a method of producing a strip of a cobalt iron alloy.

2. Related Art

Magnetically soft cobalt iron alloys (CoFe) with a Co content of 49% are used due to their exceedingly high saturation polarisation which is far above conventional magnetically soft materials. The composition of commercially available CoFe alloys is typically 49 wt % Fe, 49 wt %≤Co and 2% V, some however containing additives of Ni, Nb, Zr, Ta or B. In a composition of this type, a saturation polarisation of about 2.3 T is attained with, at the same time, a sufficiently high electrical resistance of 0.4μ·Ohm·m.

These types of alloys are used, for example, as highly saturated flux conductors or possibly for use in electrical machines. When used as a generator or motor, typically stators or rotors in the form of laminated stacks are produced. Here, the material is inserted in strip thicknesses in the region of 2.0 mm to very thin dimensions of 0.050 mm.

The material is subject to heat treatment to achieve the magnetic properties, wherein the said treatment is also designated as magnetic annealing or annealing. This heat treatment takes place above the recrystallisation temperature and below the phase transition α/α+γ, mostly in the region of 700° C. to 900° C. During the subsequent cooling, ordering in the structure takes place, i.e. a B2-superstructure is formed. The temperature at which the ordering begins when cooling depends on the composition and is typically in the region of 700° C. to 730° C. After the annealing, the material is present in a predominantly ordered state and in this state is not suitable for die-cutting (stamping or punching).

The annealing takes place at different temperatures depending on the composition and desired combination of strength and magnetic properties. Accordingly, for example, VACOFLUX 50 (49% Co, 1.9% V, 0.4% Ni, the remainder being Fe) is annealed at 820° C., VACOFLUX 48 (49% Co, 1.9% V, the remainder being Fe) at 880° C. and VACODUR 49 (49% Co, 1.9% V, 0.1% Nb, the remainder being Fe) at 880° C. or, depending on the particular application, at 750° C.

Due to the magnetic annealing and the ordering associated with it, there is change in the dimensions of the sheet. This also includes, in addition to the change in geometry described as an "increase in length", the permanent change in length dl which occurs when the material of starting length $l_0$ undergoes a typical annealing. Thus, in the following, "increase in length" will always be understood as the increase $dl/l_0$ relative to the starting length $l_0$. This increase in length is in the region of 0.03% to 0.20%.

A change in the dimensions by the annealing is not desirable since it directly affects the size accuracy of a single lamella, and therefore the finished laminated core. When applied as a stator or rotor, this can cause, for example, a change in the geometry of the air gap so that it causes an impairment of the magnetic circuit.

SUMMARY

The task is to produce a punchable strip from a CoFe alloy which has significantly reduced growth after magnetic annealing wherein the difference is small regarding the increase in the lengthwise and transverse directions.

According to the invention, a method for producing a strip of a CoFe alloy is produced wherein a slab consisting substantially of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, with the remainder being Fe and hot rolled into a hot rolled strip with up to 1 wt % of impurities and which is quenched from a temperature above 700° C. to a temperature lower than 200° C. The hot rolled strip is cold rolled into a cold rolled strip, the cold rolled strip is stationary annealed in order to produce an intermediate strip and the intermediate strip is continuously annealed.

The impurities may have one or more elements from the group consisting of O, N, S, P, Ce, Ti, Mg, Be, Cu, Mo and W.

wt % denotes weight percent.

Therefore, according to the invention, a two stage process for producing a strip from a CoFe alloy is provided. In the first step, the reversal of the cold forming is created by a stationary pre-annealing. In the second step, the strip is made ductile by continuous annealing with rapid cooling.

In the stationary pre-annealing, the removal of dislocations and the start of recrystallisation is provided. In doing so, the degree of recrystallisation is adjusted. In the second step, a partial suppression of the ordering is provided and thus the degree of ordering is adjusted. Due to the two different annealing processes according to the invention, the setting of both degree of recrystallisation and degree of ordering are decoupled from one another in the process.

Surprisingly, by using the method according to the invention, the increase in growth of the CoFe alloy is partly removed and simultaneously a punchable strip is produced.

A strip produced in this manner enables sections of strip to be produced by a die-cutting (stamping or punching) process, to subject them to annealing to adjust the optimum magnetism and then to maintain a sufficiently high degree of accuracy of shape. By doing so, small air gaps can be set providing improved efficiency for the electric machine when they are used, for example, as stators or rotors.

Subsequent correction of the geometry, such as by grinding, typically causes a worsening of the magnetic permeability at these critical places. Also, there is the risk of eddy currents since grinding processes can cause the smearing of the lamellae. Also, these types of process always entail high costs and are not even always possible depending on the geometry. By using the method according to the invention, such reworking of the resulting strip can be eliminated.

A further advantage of a strip from a CoFe alloy with a marked reduction in growth is that it is possible to design a punching tool that can be used both for FeSi (electrical sheets with 2 to 4 wt % Si) as well as for CoFe. In the case of former, conventionally produced CoFe-strip, the use of the same tool causes problems since the set geometry is changed significantly by the later growth during the annealing. By reducing growth, it is possible in principle to design a tool for both classes of material. This is an economic advantage due the very high costs of a tool of this type.

An advantage of the proposed method is that, by separating the process steps, they can be adjusted in a significantly more defined manner. Thus, during the continuous annealing, the parameters of cooling rate, holding duration (or soaking duration or dwell time), and speed through the furnace are closely coupled together. For cost reasons, it might seem actually preferable for efficient production to set as fast a speed as possible. Whereas this might help the cooling rate (by increasing it), it would also shorten the dwell time of the strip in the furnace, i.e. the degree of recrystallisation would be lowered. Furthermore, a high speed would cause the lowering of the maximum strip temperature. As a consequence, the degree of recrystallisation of the strip would be changed.

The decoupling of the process steps firstly allows a recrystallised structure to be established while stationary and then subsequently to be cooled quickly by the continuous annealing in order to ensure its ductility.

In order to adjust a high elongation to fracture, it is necessary to set the highest possible range of plastic deformability, i.e. a low yield strength and a high tensile strength.

In order to set a low yield strength, as a general principle, the annealing temperature can be raised wherein there is always a limitation during the two-phase region, i.e. during the $\alpha, \alpha+\gamma$ transition. If this temperature is exceeded, a non-magnetic phase is formed which is no longer transformed completely during cooling and causes of a sharp deterioration of the soft magnetism. In the case of VACODUR 49 for example, this transition is at 880° C., whereas with VACOFLUX 50 it occurs earlier at 820° C. due to the higher Ni content.

Because of the short dwell time, during continuous annealing a significantly higher temperature has to be selected in order for the structure to recrystallise properly. Thus it is possible to lower the 0.2% yield strength $Rp_{0.2}$ at will without permanently damaging the magnetic properties of the material.

In a first step, the method according to the invention, therefore, enables the material to recrystallise safely and a lower yield strength to be set. In a second step, the tensile strength is then raised in the continuous annealing to values greater than 1000 MPa. In doing so, the lowest possible dwell temperature is selected above the temperature at which ordering occurs, e.g. at 760° C. Due to this selected combination, a high elongation at fracture can be established even with alloys which, due to their composition, have a relatively low two phase region.

In some embodiments, the CoFe can belong to the class 49% Fe 49% Co and 2% V. In one embodiment the CoFe alloy has a composition of 48.65 wt % Co, 1.87 wt %≤V, 0.10 wt % Nb, 0.17% Ni, 0.03% Mn, 0.02% Si, less than 0.0050% C and the remainder being Fe. As a result of the melt process, other elements, each no greater than 0.02 wt % may be present. An alloy of this type is obtainable under the trade name VACODUR 49.

In one embodiment the stationary annealing is performed in a hood furnace (top-hat furnace).

The maximum temperature to which the strip is exposed during the stationary annealing depends is set based on the composition of the CoFe alloy. In some embodiments the stationary annealing is performed at a maximum temperature $T_1$ at which the ordering of the CoFe alloy in the cold rolled strip is at least partly removed during the stationary annealing and the cold rolled strip is at least partially recrystallised.

In some embodiments, the stationary annealing is performed at a maximum temperature $T_1$ which is between the phase transition $\alpha \rightarrow \alpha+\gamma$ of the CoFe alloy and 650° C. The temperature at which the phase transition $\alpha \rightarrow \alpha+\gamma$ takes place depends on the composition of the CoFe alloy, so that the upper limit of the maximum temperature $T_1$ of the continuous annealing depends on the composition of the CoFe alloy. The temperature $T_1$ can be between 650° C. and 900° C., preferably between 680° C. and 760° C. The maximum temperature $T_1$ can be maintained for a period of 30 minutes to 10 hours.

After the stationary annealing in the first step of the heat treatment, the intermediate strip is cooled typically to room temperature. The rate of cooling can be set after the stationary annealing. In one embodiment a cooling rate of at least 300 K/hr is used in the temperature range of 700° C. to 500° C. when cooling after stationary annealing. The cooling rate when cooling after stationary annealing can be adjusted, for example, by using a fan.

In some embodiments the continuous annealing is performed at a maximum temperature $T_2$ which is chosen such that the ordering of the intermediate strip is at least partially dispersed and the phase transition $\alpha \rightarrow \alpha+\gamma$ of the CoFe alloy is not exceeded. Since the temperature at which the phase transition $\alpha \rightarrow \alpha+\gamma$ occurs, based on the composition of the CoFe alloy, the upper limit of the maximum temperature $T_2$ of the continuous annealing depends on the composition of the CoFe alloy. The temperature $T_2$ can be between 650° C. and 950° C.

When cooling after continuous annealing, a rapid cooling rate is used. For example, a cooling rate of at least 1 K/sec, preferably at least 10 K/sec in the temperature range of 700° C. to 500° C. is attained. The cooling rate in the temperature range of 700° C. to 500° C. is typically not constant and varies so that the maximum cooling rate attained when cooling the strip from $T_2$ to room temperature between the temperatures 700° C. to 500° C., is at least 1 K/sec, preferably at least 10 K/sec.

In some embodiments, the strip is drawn through a continuous furnace at a speed between 2 m/min to 4 m/min in order to continuously anneal the intermediate strip. The soaking time of the intermediate strip in the heating zone of the continuous furnace with temperature $T_2$ can be between 30 seconds and 5 minutes.

The stationary annealing and/or the continuous annealing can be carried out in an inert gas or in a dry hydrogen-containing atmosphere.

The slab can be hot rolled such that after hot rolling the hot rolled strip has a thickness of $D_1$ which is between 2.0 mm and 3.5 mm.

After cold rolling, the thickness of the strip of thickness $D_1$ is reduced to a thickness $D_2$, wherein $D_2$ is between 0.50 mm and 0.050 mm.

In some embodiments, the cold rolled strip is coated further with an electrically insulating layer, after which it is stationary annealed. The electrically insulating layer can be applied to the strip in solution form. In one embodiment a solution based on Mg methylate is used after which it is dried and decomposed to form a hard inorganic layer, such as a layer of oxide, on the surface of the strip. The solution can be applied to the strip, for example, by dipping, spraying, etc. The electrically insulating layer can be an inorganic layer, comprising, for example, MgO.

After the stationary annealing the strip can have a maximum yield strength $Rp_{0.2}$ of 1000 MPa, preferably less than 800 MPa, preferably less than 600 MPa and/or a maximum Vickers hardness HV of 350, preferably less than 300. After the stationary annealing the tensile strength $R_m$ of the strip can be less than 1000 MPa.

After the stationary annealing the maximum yield strength $Rp_{0.2}$ of the strip in the longitudinal direction can be 1000 MPa, preferably less than 800 MPa, preferably less than 600 MPa and/or a maximum Vickers hardness HV of 350, preferably less than 300, and/or a tensile strength $R_m$ in the longitudinal direction of less than 1000 MPa. The longitudinal direction runs parallel to the direction of rolling.

After subsequent continuous annealing, the tensile strength of the strip rises again wherein the yield strength remains virtually unchanged. For example, the tensile strength increases in the longitudinal direction to values above 1000 MPa, wherein the yield strength remains virtually unchanged. These mechanical properties enable the strip to be punched and therefore parts from the strip can be formed. These parts can be the sheets of a laminated core having the desired shape for the laminated core, such as an E shape for a transformer or a round shape for a stator or rotor of a rotating electrical machine or the shape of a curved core for a partial segment of a rotating electrical machine or the shape of a core for the stator of a linear motor.

In some embodiments, after continuous annealing the tensile strength of the strip in the longitudinal direction is greater than 1100 MPa and its elongation to fracture in the longitudinal direction is greater than 17%. In the transverse direction, the tensile strength of the strip is greater than 1000 MPa with an elongation to fracture higher than 7%.

The slab can be produced from molten material consisting substantially of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, with an Fe remnant and up to 1 wt % of impurities. The molten material is poured under a vacuum and, after solidifying, formed into an ingot. The ingot can then be hot rolled to form a slab.

The impurities in the molten material can have one or more of the group O, N, S, P, Ce, Ti, Mg, Be, Cu, Mo and W.

In some embodiments the CoFe alloy can belong to the class 49% Fe 49% Co and 2% V. In one embodiment the CoFe alloy has a composition of 48.65 wt % Co, 1.87 wt %≤V, 0.10 wt % Nb, 0.17% Ni, 0.03% Mn, 0.02% Si, less than 0.0050% C and the remainder being Fe. As a result of the melting process, other elements, each having a content of no greater than 0.02 wt % may be present. An alloy of this type is obtainable under the trade name VACODUR 49.

In a further embodiment, after the continuous annealing at least one sheet is formed from the strip. The sheet can undergo an annealing process. The sheet or the sheets can be formed by punching or eroding or can be cut by water jet or by a laser.

The annealing can be performed in a stationary fashion and/or continuously. Depending on the composition and the desired combination of strength and magnetic properties, the annealing takes place at different temperatures. For example, VACOFLUX 50 (49% Co, 1.9% V, 0.4% Ni, the remainder being Fe) is annealed in this manner at 820° C., VACOFLUX 48 (49% Co, 1.9% V, the remainder being Fe) at 880° C. and VACODUR 49 (49% Co, 1.9% V, 0.1% Nb, the remainder being Fe) at 880° C. or, depending on the application, at 750° C. also.

In some embodiments the annealing is carried out at 880° C. for 6 hrs in a hydrogen-containing atmosphere with a dew point of −30° C., preferably −50° C.

In some embodiments, after annealing, the difference between the permanent growth in the longitudinal direction and the permanent growth in the transverse direction of the strip is less than 0.08%, preferably less than 0.05%.

After continuous annealing, in a repetitive bending test the strip or sheet can have a bending coefficient to fracture of at least 20.

A method for producing a laminated core is also produced. A plurality of sheets is produced in accordance with one of the embodiments described here and stacked to form a laminated core.

A strip of a CoFe alloy is prepared, having a composition consisting of substantially 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, with a remainder of Fe and up to 1 wt % of impurities, having a maximum strip width of 0.50 mm, preferably less than 0.35 mm, a permanent growth in length after magnetic annealing in the region of 730° C. up to the phase transition α→α+γ of a maximum of 0.08%, preferably a maximum of 0.05%, an elongation to fracture of A≥5%, preferably A≥10%, a yield strength $Rp_{0.2}$≤1000 MPa, preferably $Rp_{0.2}$ 800 MPa, and a tensile strength $R_m$≥800 MPa, preferably $R_m$≥1000 MPa.

The impurities may have one or more elements from the group consisting of O, N, S, P, Ce, Ti, Mg, Be, Cu, Mo and W.

In some embodiments the CoFe alloy can belong in the class 49% Fe 49% Co and 2% V. In one embodiment the CoFe alloy has a composition of 48.65 wt % Co, 1.87 wt %≤V, 0.10 wt % Nb, 0.17% Ni, 0.03% Mn, 0.02% Si, less than 0.0050% C, the remainder being Fe. As to melting properties, the contents include other elements, each no greater than 0.02 wt %. An alloy of this type is obtainable under the trade name VACODUR 49.

In one embodiment the strip furthermore has an inorganic coating. The inorganic coating can comprise MgO.

In some embodiments, after the annealing, the difference between the permanent growth in the longitudinal direction and the permanent growth in the transverse direction of the strip is less than 0.08%, preferably less than 0.05%.

A laminated core having a plurality of stacked sheets of a CoFe alloy is also produced. The CoFe alloy has a composition consisting substantially of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, the remainder being Fe as well as up to 1 wt % of impurities, wherein the impurities can have one or more from the group O, N, S, P, Ce, Ti, Mg, Be, Cu, Mo and W. The thickness of the sheets is a maximum of 0.50 mm, preferably less than 0.35 mm, a permanent length growth, after annealing, in the region of 700° C. up to the phase transition α→α+γ no more than 0.08%, preferably no more than 0.05%, an elongation to fracture A≥5%, preferably A 10%, a yield strength $Rp_{0.2}$≤1000 MPa, preferably $Rp_{0.2}$≤800 MPa, and a tensile strength $R_m$≥800 MPa, preferably $R_m$≥1000 MPa.

In some embodiments, the sheets have an inorganic coating which can have, for example, MgO. The difference between the permanent growth in the longitudinal direction and the permanent growth in the transverse direction of the strip is less than 0.08%, preferably less than 0.05%.

In some embodiments the CoFe alloy can belong to the class 49% Fe 49% Co and 2% V. In one embodiment the CoFe alloy has a composition of 48.65 wt % Co, 1.87 wt %≤V, 0.10 wt % Nb, 0.17% Ni, 0.03% Mn, 0.02% Si, less than 0.0050% C, the remainder being Fe. As to melting properties, the contents include other elements, each no greater than 0.02 wt %. An alloy of this type is obtainable under the trade name VACODUR 49.

BRIEF DESCRIPTION OF THE DRAWINGS

Embodiments and examples will now be explained in more detail with reference to the drawings and tables.

DETAILED DESCRIPTION OF EXAMPLE EMBODIMENTS

Figure 1:
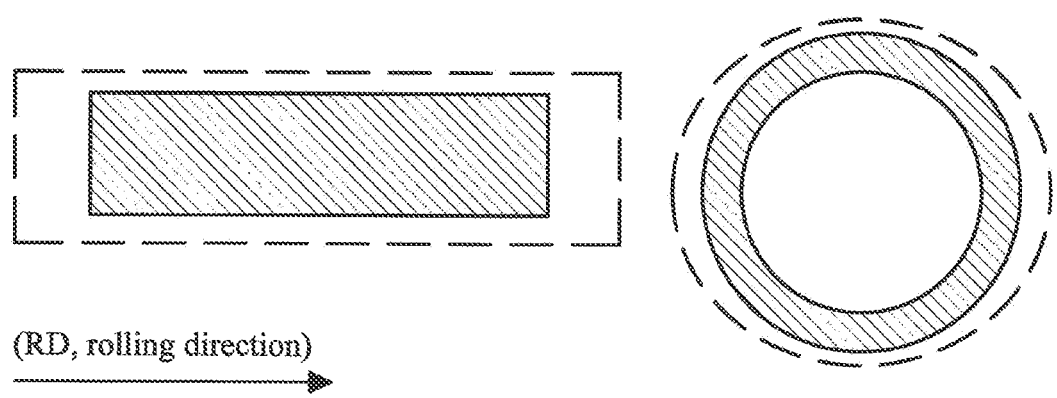
FIG. 1 shows a diagrammatic illustration of the permanent growth by the dotted line for a circular and a rectangular sheet.

FIG. 1 shows a diagrammatic illustration of a sheet of a soft magnetic CoFe alloy, showing the permanent growth after annealing. The permanent growth is illustrated diagrammatically in FIG. 1 by the dotted line for a circular and a rectangular sheet.

The soft magnetic cobalt iron alloy (CoFe) can have a composition of 49 wt % Fe, 49 wt % Co and 2% V and contain additives of Ni, Nb, Zr, Ta or B. In the case of a composition of this type, a saturation polarisation of about 2.3 T is attained, while at the same time the electrical resistance remains sufficiently high at 0.4μ·Ohm·m.

The CoFe alloy undergoes heat treatment to achieve the magnetic properties, said heat treatment also being known as magnetic annealing or final annealing. This heat treatment takes place above the recrystallisation temperature and below the phase transition α→α+γ, mostly in the region of 700° C. to 900° C. During the subsequent cooling, ordering takes place, i.e. a B2 superstructure is formed. Depending on the composition and the desired combination of strength and magnetic properties, the annealing takes place at different temperatures. For example, VACOFLUX 50 (49% Co, 1.9% V, 0.4% Ni, the remainder being Fe) is annealed in this manner at 820° C., VACOFLUX 48 (49% Co, 1.9% V, the remainder being Fe) at 880° C. and VACODUR 49 (49% Co, 1.9% V, 0.1% Nb, the remainder being Fe) at 880° C., or, depending on the application, at 750° C. also.

Due to the magnetic annealing and the ordering associated with it, the dimensions of the sheet are altered. Thus, the permanent variation in length dl is to be understood as the "growth in length" which happens when the material of initial length $l_0$ undergoes typical annealing. Below therefore, "growth in length" will always be understood as the growth $dl/l_0$ relative to the initial length. This growth in length is in the region of 0.03% to 0.20%.

The described change in the dimensions by the annealing is undesirable since it directly affects the dimensional accuracy of a single lamella, as well as the finished laminated core. When used as a stator or rotor, this can cause a change in the geometry of the air gap so that the result is impairment of the magnetic circuit.

A rectangular test piece of a VACOFLUX 50 strip with a strip thickness of, for example, 0.35 mm incurs, during an annealing process of 4 hrs at 820° C., a change in length in the region of 0.1% to 0.2%. During this time, anisotropy of the growth is observed, i.e. in the longitudinal direction the strip undergoes a greater growth than in the transverse direction wherein the longitudinal direction is parallel to the rolling direction of the strip.

A closer observation shows that this anisotropy of the growth is correlated with the degree of cold forming. With degrees of cold forming >60%, the growth in the longitudinal direction rises significantly, whereas the growth in the transverse direction hardly changes. This anisotropy of the growth reveals a problem, particularly in the case of circular geometries, as would be found, for example, in electrical machines, since a round shape becomes an ellipse, as illustrated in FIG. 1.

In one embodiment the strip according to the invention is produced as follows:
  hot rolling a slab of a CoFe alloy, typically to a thickness of 2.0 mm to 3.5 mm,
  quenching from a temperature above 700° C.,
  cold rolling to a final thickness, which can be, for example, 0.50 mm to 0.050 mm to form a cold rolled strip,
  covering the cold rolled strip with an electrically insulating layer, for example, with an inorganic layer based on Mg methylate,
  stationary annealing, such as in a hood furnace, followed by
  continuous annealing.

Annealing to adjust the magnetic properties can be carried out after the continuous annealing and the subsequent cooling to room temperature.

Conventional intermediate steps may be inserted at each stage during the production of the strip, such as shot blasting, pickling, grinding, trimming, stretch-bend-levelling or the attachment of a tie rod.

The CoFe alloy can be, for example, VACODUR 49 with a composition of 48.65 wt % Co, 1.87 wt %≤V, 0.10 wt % Nb, 0.17% Ni, 0.03% Mn, 0.02% Si, less than 0.0050% C and the remainder being Fe.

As to melting properties, the contents include other elements, each no greater than 0.02 wt %. This embodiment is representative of the class of materials also designated as V-Permendur with the rough constituents 49% Fe 49% Co and 2% V.

The coating of the cold rolled strip serves to avoid the layers of strip welding together during the subsequent stationary annealing. A coating solution used is an inorganic coating based on Mg methylate which is partly converted during heat treatment into solid Mg oxide. The coating before stationary annealing can be dispensed with if the risk of the welding of the layers of strip is low. In some embodiments the strip is coated at a later time to form the electrical insulation between the stacked sheets of the laminated core.

The stationary annealing can take place in a hood furnace. This first heat treatment serves to deliberately alleviate the earlier cold forming of the strip, i.e. it removes dislocations and the start of primary recrystallisation. The maximum temperature at which the strip is raised is chosen such that the ordering is at least partially removed and is not allowed to exceed the phase transition α→α+γ. The soaking temperature of the stationary annealing is therefore in the range of 650° C. to 900° C., preferably at 680° C. to 760° C., after which it is cooled to room temperature.

During stationary annealing, typically the cooling rate is between 50 K/hr and 200 K/hr in the temperature range of 700° C. to 500° C. However, this can vary depending on the furnace used and the loading of the furnace. Generally, rapid cooling is preferable, e.g. using a fan, so that cooling rates are attained in the aforementioned range of at least 300 K/hr.

This second continuous annealing serves to make the at least partially recrystallised strip ductile by rapid cooling. The maximum temperature of the strip is selected in this process such that the ordering is at least partially broken up and the phase transition $\alpha \rightarrow \alpha+\gamma$ is not exceeded. Therefore, the temperature range is 650° C. to 950° C. and, depending on the composition, can vary. Preferably in the case, for example, of VACODUR 49, 760° C. at 2 m/min to 4 m/min is specified to avoid any further recrystallisation of the strip. The cooling rate should reach in the region of 700° C. to 500° C. at a minimum of 1 K/sec, preferably at least 10 K/sec.

The strip produced in this manner has the following properties:
- strip thickness maximum 0.50 mm, preferably lower than 0.35 mm
- growth in length of a maximum of 0.08%, preferably a maximum of 0.05%, after magnetic annealing in the region of 700° C. up to the phase transition $\alpha \rightarrow \alpha+\gamma$.
- presence of a hard inorganic coating, e.g. in the form of Mg oxide.
- elongation to fracture A>5%, preferably A>10%; 0.2%-yield strength $Rp_{0.2}$>1000 MPa In the following, the invention is explained with the aid of a series of tests with 7 different samples.

TABLE 1

| # | Classification | Stationary annealing | Continuous annealing | annealing |
|---|---|---|---|---|
| 1 | Comparison | — | — | 6 hrs 880 ° C., $H_2$ |
| 2 | Comparison | 700° C. 2 hrs, $H_2$ | — | 6 hrs 880° C., $H_2$ |
| 3 | Comparison | 750° C. 2 hrs, $H_2$ | — | 6 hrs 880° C., $H_2$ |
| 4 | Comparison | — | 820° C. 3 m/min, $H_2$ | 6 hrs 880° C., $H_2$ |
| 5 | Comparison | — | 760° C. 3 m/min, $H_2$ | 6 hrs 880° C., $H_2$ |
| 6 | Invention | 700° C. 2 hrs, $H_2$ | 760° C. 3 m/min, $H_2$ | 6 hrs 880° C., $H_2$ |
| 7 | Invention | 750° C. 2 hrs, $H_2$ | 760° C. 3 m/min, $H_2$ | 6 hrs 880° C., $H_2$ |

Table 1 shows an overview of the conducted tests. In it, the embodiment 1 represents the as-rolled comparison state. Examples 2 and 3 were subject just to stationary annealing and examples 4 and 5 just to continuous annealing. These examples 2 to 5 therefore are not a part of the present invention. In a first step, examples 6 and 7 are stationary annealed and in a subsequent second step are continuously annealed. Thus examples 6 and 7 are part of the present invention.

In the above, a strip of VACODUR 49 is used with a composition of 48.65 wt % Co, 1.87 wt % V, 0.10 wt % Nb, 0.17% Ni, 0.03% Mn, 0.02% Si, less than 0.0050% C and the remainder being Fe. As to melting properties, the contents include other elements, each no greater than 0.02 wt %. This embodiment is representative of the class of materials also designated as V-Permendur with the rough constituents 49% Fe 49% Co and 2% V.

The embodiment 1 did not undergo any stationary annealing nor any continuous annealing. After being formed by punching, the parts thus obtained were subject to magnetic annealing for 6 hrs at 880° C. The annealing was performed in this case under dry hydrogen with a dew point of −50° C. This annealing was carried out in the same manner as for the variants 2 to 7 described below.

In contrast, embodiments 2 and 3 were subject to stationary annealing before the magnetic annealing. In doing so, the coil with a weight of typically 50 kg to 1000 kg was annealed in a hood furnace under dry hydrogen. Temperatures of 700° C. or 750° C. with a soaking time of 2 hrs were chosen for both variants. In embodiment 2, this caused the healing or removal of dislocations, while in example 3 this led directly to significant recrystallisation. The strips were coated beforehand with a Mg methylate solution so that the annealing caused no welding together of layers of strip.

Embodiments 4 and 5 were subject to continuous annealing before the magnetic annealing. In doing so, the uncoated strip was conveyed through a vertical tower furnace with a heating zone of length 3 m. The strip speed was 3 m/min, i.e. the soaking time in the heating zone was 1 minute. The atmosphere used was dry hydrogen, wherein the dew point was below −30° C. Cooling took place by being conveyed through a water-cooled muffle. Here, cooling rates in the strip of about 5 K/sec to 40 K/sec were achieved.

Embodiments 6 and 7 represent the states according to the invention. In these cases, the stationary annealed strips from embodiments 2 and 3 were then continuously annealed in the tower furnace. The other parameters (strip speed, atmosphere, cooling rate) were analogous to examples 4 and 5.

In Table 2, mechanical characteristics from the hardness testing (Vickers hardness) and from the tensile test are illustrated. Direct characteristics from the tensile test are the 0.2% yield strength ($Rp_{0.2}$) and the tensile strength ($R_m$) as well as the elongation to fracture A. Here, in each case, tensile tests lengthwise and transverse to the rolling direction were undertaken and tested. The difference $R_m - Rp_{0.2}$, which represents a measure for the range of plastic deformability still serves as the calculated characteristic value.

TABLE 2

| | | | | Tensile test, lengthwise | | | | Tensile test, transverse | | | |
|---|---|---|---|---|---|---|---|---|---|---|---|
| # | R/E | Stationary Continuous | Hardness HV | $Rp_{0.2}$ MPa | $R_m$ MPa | $R_m - RP_{0.2}$ | A % | $RP_{0.2}$ MPa | $R_m$ MPa | $R_m - RP_{0.2}$ | A % |
| 1 | R | — | 390 | 1168 | 1298 | 130 | 1.4 | 1257 | 1404 | 147 | 0.7 |
| 2 | R | 700° C. 2 hrs | 326 | 727 | 972 | 245 | 7.0 | 844 | 942 | 97 | 4.2 |
| 3 | R | 750° C. 2 hrs | 229 | 402 | 577 | 175 | 4.4 | 449 | 535 | 86 | 3.3 |

TABLE 2-continued

| # | R/E | Stationary Continuous | Hardness HV | Tensile test, lengthwise | | | | Tensile test, transverse | | | |
|---|---|---|---|---|---|---|---|---|---|---|---|
| | | | | $Rp_{0.2}$ MPa | $R_m$ MPa | $R_m - Rp_{0.2}$ | A % | $RP_{0.2}$ MPa | $R_m$ MPa | $R_m - RP_{0.2}$ | A % |
| 4 | R | — 820° C. 3 m/min | 261 | 537 | 1155 | 618 | 20.5 | 574 | 975 | 402 | 10.2 |
| 5 | R | — 760° C. 3 m/min | 346 | 880 | 1195 | 315 | 9.3 | 1009 | 1111 | 102 | 3.9 |
| 6 | E | 700° C. 2 hrs 760° C. 3 m/min | 324 | 796 | 1363 | 567 | 17.3 | 899 | 1139 | 241 | 7.9 |
| 7 | E | 750° C. 2 hrs 760° C. 3 m/min | 251 | 498 | 1164 | 667 | 18.8 | 539 | 1085 | 546 | 12.7 |

Table 2 shows mechanical characteristics from hardness tests and tensile tests on the tested examples 1 to 7 for the comparison states (R) and states according to the invention (E).

In the cold rolled comparison example 1, due to the high deformation from rolling, it has a very high yield strength and tensile strength and the elongation to fracture is very low at less than 2%.

The comparison examples 2 and 3 show that, due to stationary annealing alone both the yield strength as well as the tensile strength are significantly lowered. Because of the slightly reduced hardness of comparison example 2 of 326 HV it can be seen that the material is not yet completely recrystallised. On the other hand, embodiment 3 with a Vickers hardness of 229 is significantly softer and displays a recrystallised structure, as can be seen also in the microstructure slide.

Comparison examples 4 and 5 show that, with continuous annealing alone, the yield strength is also severely lowered. Here, compared with comparison example 5, due to the higher annealing temperature of 820° C. against 760° C. at the same throughput speed, comparison example 4 shows a more severe lowering of the yield strength. In contrast, the tensile strength in the longitudinal direction rises to values greater than 1100 MPa, regardless of the choice of annealing temperature. The tensile strength in the transverse direction also rises and reaches values greater than 900 MPa. The elongation to fracture in the transverse direction is markedly different and, in the case of comparison example 5, only attains a value of below 4%.

Examples 6 and 7 according to the invention show an almost unchanged but slightly elevated yield strength compared with the respective stationary annealed comparison examples 2 and 3. In contrast, the tensile strength in the longitudinal direction rises similarly as in the continuously annealed strips to a value greater than 1100 MPa. In the longitudinal direction, both strips display a very high elongation to fracture of more than 17%. In the transverse direction, it is also very advantageous. Both strips attain values for tensile strength greater than 1000 MPa and values for elongation to fracture greater than 7%.

The increase in the tensile strength in all continuous annealings is attributed to the associated rapid cooling and to the associated degree of ordering.

In order to adjust a high elongation to fracture it is necessary to establish a region of plastic deformability which is as wide as possible, i.e. to produce a strip with a low yield strength and a high tensile strength.

As a general principle, the annealing temperature can be raised to set a low yield strength, wherein the two phase region presents a limitation, i.e. during the transition α→α+γ. This temperature is exceeded, a non-magnetic phase is formed which no longer completely changes during cooling and causes a severe weakening of the soft magnetism. In the case of VACODUR 49, for example, this transition is at 880° C., whereas with VACOFLUX 50 it is 820° C. due to the higher Ni content.

In continuous annealing alone, due to the short dwell time, a significantly higher temperature must be selected so that the structure recrystallises well. Thus, it is not possible to lower $Rp_{0.2}$ without damaging the material permanently with regard to its magnetic properties.

The method according to the invention enables the material to recrystallise completely and a low yield strength to be set in a first step. In a second step, the tensile strength can then be increased to values higher than 1000 MPa by continuous annealing. In doing so, a dwell temperature that is as low as possible and above the ordering temperature is chosen, for example, at 760° C. By using this combination, a high elongation to fracture can be set even with alloys which have a relatively low two phase region due to their composition.

In Table 3, the permanent growth in length $dl/l_0$ of the embodiments is quoted. For this, strips measuring 160 mm×20 mm long and transverse to the rolling direction are cut and their initial length $l_0$ is measured optically. The strips then underwent magnetic annealing (6 hrs 880, $H_2$), after which they were measured again. The relative growth in length $dl/l_0$ was then calculated from the measured growth dl.

Furthermore, the amount of the difference between the characteristic values $l=dl/l_0$ (growth in the longitudinal direction) and $q=dl/l_0$ (growth in transverse direction) was calculated as the measure for the anisotropy of the growth. This quantity is designated here as |l-q|.

TABLE 3

| | | | Growth | | |
|---|---|---|---|---|---|
| # | R/E | Stationary Continuous | $l = dl/l_0$ in % longitud. | $q = dl/l_0$ in % transv'se | |l-q| |
| 1 | R | — — | 0.138% | 0.092% | 0.046% |
| 2 | R | 700° C. 2 hrs — | 0.000% | 0.004% | 0.004% |
| 3 | R | 750° C. 2 hrs — | −0.006% | −0.002% | 0.004% |
| 4 | R | — 820° C. 3 m/min | 0.031% | 0.036% | 0.005% |
| 5 | R | — | 0.028% | 0.032% | 0.004% |

TABLE 3-continued

| | | | Growth | | |
|---|---|---|---|---|---|
| # | R/E | Stationary Continuous | $l = dl/l_0$ in % longitud. | $q = dl/l_0$ in % transv'se | \|l-q\| |
| 6 | E | 760° C. 3 m/min 700° C. 2 hrs 760° C. 3 m/min | 0.028% | 0.041% | 0.013% |
| 7 | E | 750° C. 2 hrs 760° C. 3 m/min | 0.032% | 0.034% | 0.002% |

Table 3 shows the permanent growth in length $dl/l_0$ after additional annealing for 6 hrs at 880° C. for comparison states (R) and states according to the invention (E).

The permanent growth in length of the as-rolled comparison example 1 is 0.138% in the longitudinal direction and 0.092% in the transverse direction in the expected range for a 50% CoFe material with significant cold deformation of over 80%. The growth is so large that taking this growth into account is almost not possible, or can be achieved only with great difficulty by a corresponding adaptation of a punching tool. This is made more difficult in particular because the anisotropy |l-q| at 0.046% is very large.

The permanent growth in length of the stationary annealed material of examples 2 and 3 is the lowest and falls within the range of measurement inaccuracy. The disadvantage of these states is the inadequate ability to be punched.

The permanent growth in length of purely continuously annealed material of examples 4 and 5 is in the region of 0.03% to 0.04% and is very isotropic. Therefore, it is so low that it can be compensated by a corresponding design of the punching tool.

The permanent growth in length of the material according to the invention of examples 6 and 7 is practically identical in the region 0.03% to 0.04%. It can be assumed therefore that the absolute amount of the growth is determined by the cooling rate as it continues though. In these tests, the cooling rate was in the range 700° C. to 500° C. at 5 K/sec to 40 K/sec.

Figure 2:
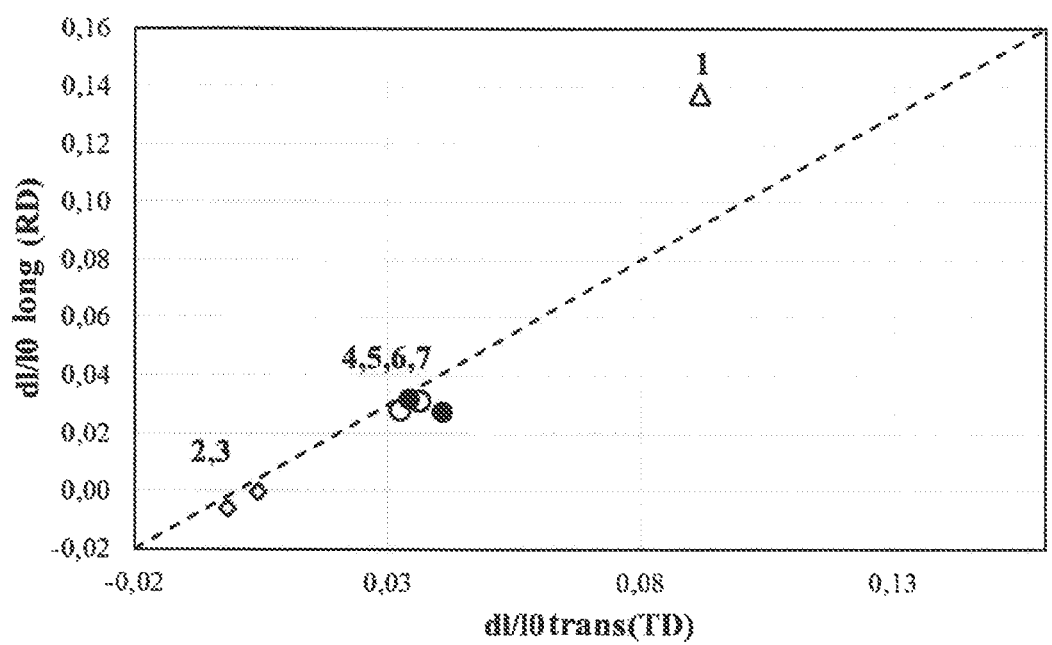
FIG. 2 shows the measured growth longitudinally and transversely to the rolling direction for some examples.

FIG. 2 shows the measured growth longitudinally and transversely to the rolling direction for the tested states (1-7).

FIG. 2 shows the longitudinal and transverse growth of the tested states after additional magnetic annealing for 6 hrs at 880° C.

The plotted dotted line corresponds to an isotropic growth, i.e. an identical value for the longitudinal growth and the transverse growth.

Also, the cutting and bending properties were calculated, as in Table 4.

TABLE 4

| | | | | To and fro bending test | | | |
|---|---|---|---|---|---|---|---|
| # | R/E | Stationary Continuous | Cutting | N long. | Assess long. | N trans | Assess trans |
| 1 | R | — | very good | 66 | + | 9 | − |
| 2 | R | 700° C. 2 hrs | very bad | 109 | ++ | 15 | − |
| 3 | R | 750° C. 2 hrs | bad | 1 | − | 7 | − |
| 4 | R | — 820° C. 3 m/min | very good | 70 | + | 68 | + |
| 5 | R | — 760° C. 3 m/min | very good | 79 | + | 38 | + |
| 6 | E | 700° C. 2 hrs 760° C. 3 m/min | very good | 128 | ++ | 31 | + |
| 7 | E | 750° C. 2 hrs 760° C. 3 m/min | very good | 158 | ++ | 70 | + |

Table 4 shows the cutting and bending properties of the tested states.

The cutting property was determined by having the material cut with cuts lengthwise to the rolling direction. An assessment of "very good" corresponds in this case to a smooth cut edge with no tears or other deficiencies. This corresponds to the as-rolled comparison example 1.

This cutting property is worsened significantly by stationary annealing. Depending on the annealing, the cutting produced was very bad, displaying tears in comparison example 2 extending diagonal to the cutting direction, or at least a poor cutting property, seen as small tears on the cut edge of the comparison example 3.

The purely continuously annealed comparison examples 4 and 5 display a very good cutting property.

The examples 6 and 7 according to the invention also display a very good cutting property.

In addition, the bending property was determined in the alternating bending test under DIN EN ISO 7792. The bending coefficient N was determined as follows: A strip of dimensions 20 mm×20 mm was taken lengthwise to the rolling direction. The bending was then performed perpendicular to the extraction direction so that the strip was bent transverse to the rolling direction for the "lengthwise" bending coefficient. In the same manner, the strip was taken transverse to the rolling direction and was bent lengthwise to the rolling direction for the "transverse" bending coefficient.

The assessment of the bending coefficient was done according to the following division: fewer than 20 bending cycles (N<20) corresponds to a poor bending property (−), up to 99 bending cycles (20≤N≤99) corresponds to a good bending property (+) and 100 or more bending cycles (N≥100) corresponds to a very good bending property (++). It should be noted that the number of bending cycles is strongly dependant on the thickness of the strip used. With thicker material, generally a smaller bending coefficient can be expected.

In the lengthwise direction, the as-rolled comparison example 1 displays a good bending property (+), but transversely the bending property is inadequate (−). The stationary annealed comparison examples 2 and 3 show very different results longitudinally (++ or, respectively, −) and transversely a consistently poor bending property (−). The continuously annealed comparison examples 4 and 5 show a consistently good bending property both in the longitudinal as well as in the transverse directions (+).

The examples 6 and 7 according to the invention display by far the best bending property longitudinally (++) and transversely a good bending property also (+).

Figure 3:
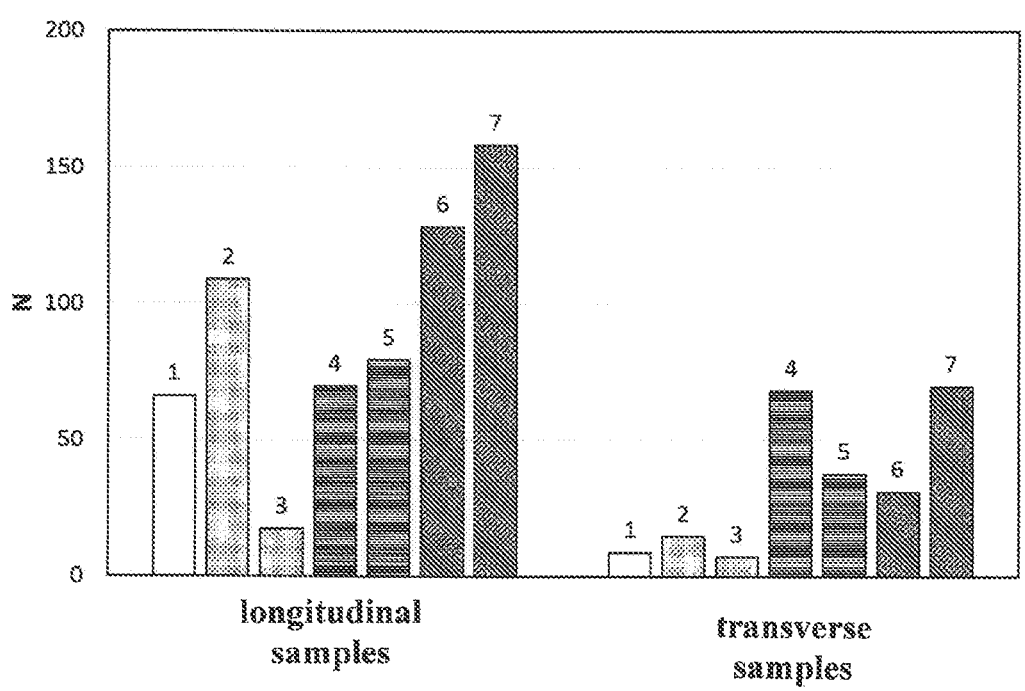
FIG. 3 shows a diagrammatic illustration of the number of bending cycles N.

A graphic illustration of the number of bending cycles N can be found in FIG. 3.

Figure 4:
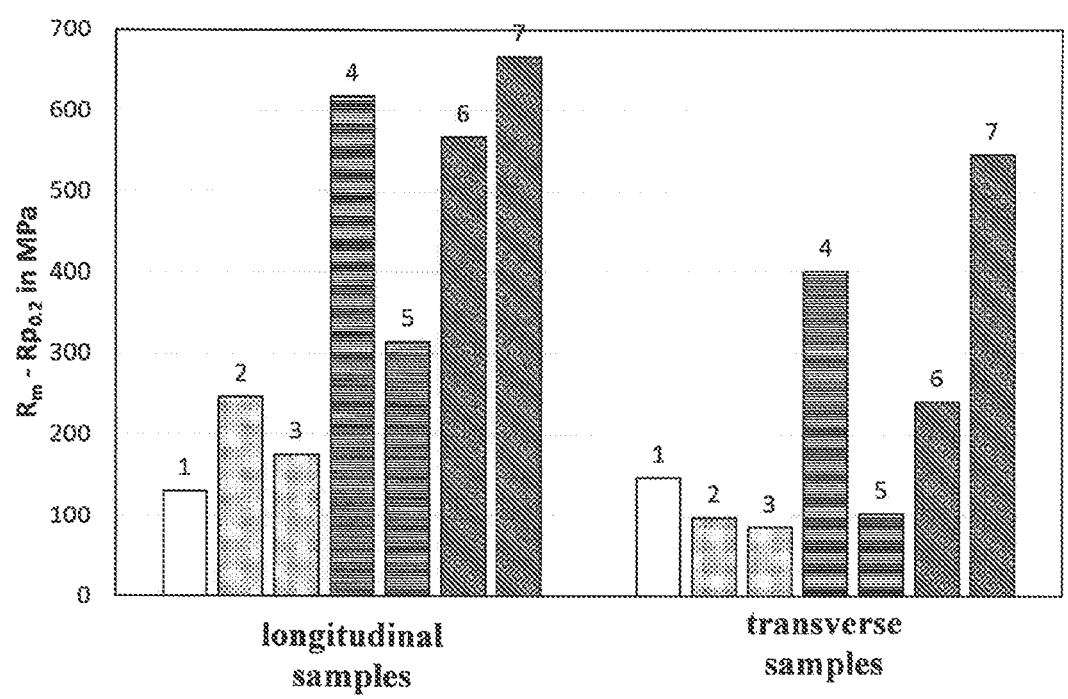
FIG. 4 shows a graphic illustration of the difference between $R_m$ and $R_{p0.2}$.

FIG. 4 shows a graphic illustration of the calculated difference $R_m - Rp_{0.2}$ derived from Table 2, illustrating a measure for the range of plastic deformability.

In order to set a high elongation to fracture it is advantageous to set a range of plastic deformability as broad as possible, i.e. to produce a strip with a low yield strength and a high tensile strength. A high tensile strength and low yield strength and therefore a large difference can be attained by the method according to the invention.

Summarising:

The stationary annealing alone completely removes the growth in length. The cutting and bending properties in the transverse direction are, however, inadequate for further processing, such as punching.

Examples which are only continuously annealed have a low and isotropic permanent growth. The bending property is improved significantly.

The annealed examples according to the invention which are first stationary annealed and then continuously annealed also have a small and isotropic permanent growth. In this case, the bending property in the longitudinal direction is significantly better than in the case of all comparison examples.

According to the invention, the recrystallisation can be precisely controlled by stationary annealing in the first step. As a result of this, depending on the degree of recrystallisation, a reduction in the yield strength $Rp_{0.2}$ can be adjusted with accuracy. The yield strength remains practically unchanged due to the subsequent continuous annealing in the second step, whereas the tensile strength $R_m$ rises again significantly to values greater than 1000 MPa.

Therefore, the method according to the invention decouples the lowering of the yield strength and the raising of the tensile strength and therefore enables the specific setting of a high elongation to fracture A in a strip of a CoFe alloy. Therefore, this strip can be processed further, for example by punching, in order to form parts for a laminated core which also have a low permanent growth in length after annealing. Thus, a laminated core for a rotor or stator can be produced with more accurate geometry.

The invention claimed is:

1. A method for producing a strip from a CoFe alloy, comprising:
    hot rolling a slab consisting of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, with the remainder being Fe as well as up to 1 wt % of impurities, wherein the impurities optionally include one or more elements from the group consisting of O, N, S, P, Ce, Ti, Mg, Be, Cu, Mo and W, to form a hot rolled strip, followed by quenching the hot rolled strip from a temperature above 700° C. to a temperature lower than 200° C.,
    cold rolling the hot rolled strip to form a cold rolled strip,
    stationary annealing of the cold rolled strip, in order to produce an intermediate strip, and continuously annealing the intermediate strip to form a strip.

2. A method according to claim 1, wherein the stationary annealing is performed in a hood furnace.

3. A method according to claim 1, wherein the stationary annealing is performed at a maximum temperature $T_1$ at which the ordering of the CoFe alloy in the cold rolled strip is at least partly removed during the stationary annealing and the cold rolled strip is at least partially recrystallised.

4. A method according to claim 3, wherein the temperature $T_1$ is between 650° C. and 900° C.

5. A method according to claim 3, wherein a cooling rate of at least 300 K/hr is used in the temperature range of 700° C. to 500° C. when cooling after stationary annealing.

6. A method according to claim 1, wherein the stationary annealing is performed at a maximum temperature $T_1$ which is between the phase transition α→α+γ of the CoFe alloy and 650° C.

7. A method according to claim 1, wherein the cooling rate when cooling after stationary annealing is adjusted by using a fan.

8. A method according to claim 1, wherein continuous annealing is performed at a maximum temperature $T_2$ which is chosen such that the ordering of the intermediate strip is at least partially dispersed and the phase transition α→α+γ of the CoFe alloy is not exceeded.

9. A method according to claim 8, wherein the temperature $T_2$ is between 650° C. and 950° C.

10. A method according to claim 8, wherein, when cooling after continuous annealing, a cooling rate of at least 1 K/sec in the range of 700° C. to 500° C., is attained.

11. A method according to claim 8, wherein a soaking time of the intermediate strip in a heating zone of a continuous furnace with temperature $T_2$ is between 30 seconds and 5 minutes.

12. A method according to claim 1, wherein the intermediate strip is drawn through a continuous furnace at a speed between 2 m/min to 4 m/min in order to continuously anneal the intermediate strip.

13. A method according to claim 1, wherein the stationary annealing and/or the continuous annealing is carried out in an inert gas or in a dry hydrogen-containing atmosphere.

14. A method according to claim 1, wherein the hot rolled strip has a thickness of $D_1$ which is between 2.0 mm and 3.5 mm.

15. A method according to claim 1, wherein the cold rolled strip has a thickness $D_2$ which is between 0.50 mm and 0.050 mm.

16. A method according to claim 1, wherein the cold rolled strip is coated further with an electrically insulating layer, after which it is stationary annealed.

17. A method according to claim 16, wherein the electrically insulating layer is applied by means of a solution based on Mg methylate.

18. A method according to claim 16, wherein the insulating layer is an inorganic layer having MgO.

19. A method according to claim 1, wherein after stationary annealing the intermediate strip has a maximum yield strength Rp0.2 of 1000 MPa.

20. A method according to claim 1, wherein after stationary annealing the intermediate strip has a maximum Vickers hardness HV of 350.

21. A method according to claim 1, wherein the method further comprises producing a melt consisting of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, with the remainder being Fe and up to 1 wt % of impurities, wherein the impurities optionally include one or more of the group O, N, S, P, Ce, Ti, Mg, Be, Cu, Mo and W, casting the melt under a vacuum and, after solidifying, forming an ingot, wherein the ingot is hot rolled to form the slab.

22. A method according to claim 1, wherein, after continuous annealing, at least one sheet is formed from the strip.

23. A method according to claim 22, wherein the sheet is formed by punching or eroding or the sheet is cut by water jet or by a laser.

24. A method according to claim 22, wherein the sheet undergoes an annealing process.

25. A method according to claim 24, wherein the annealing is performed in a stationary fashion and/or continuously.

26. A method according to claim 24, wherein the annealing is performed at 880° C. for 6 hrs in a hydrogen-containing atmosphere with a dew point of 30° C.

27. A method according to claim 24, wherein after annealing, the difference between the permanent growth in the longitudinal direction and the permanent growth in the transverse direction of the strip is less than 0.08%.

28. A method according to claim 1, wherein, after continuous annealing in a repetitive bending test, the strip has a bending coefficient to fracture of at least 20.

29. A method for producing a laminated core, comprising: producing several sheets according to claim 22, and stacking the sheets to form a laminated core.

* * * * *